US008275802B2

(12) United States Patent
Mewhinney et al.

(10) Patent No.: US 8,275,802 B2
(45) Date of Patent: Sep. 25, 2012

(54) OPTIMIZED LEAST RECENTLY USED LOOKUP CACHE

(75) Inventors: Greg R. Mewhinney, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 10/870,458

(22) Filed: Jun. 17, 2004

(65) Prior Publication Data

US 2005/0283573 A1    Dec. 22, 2005

(51) Int. Cl.
*G06F 17/30*    (2006.01)
(52) U.S. Cl. ........................................... 707/800
(58) Field of Classification Search .......... 707/100–102, 707/791, 800, 801; 711/117–173
See application file for complete search history.

(56) References Cited

U.S. PATENT DOCUMENTS

| 5,404,483 | A | * | 4/1995 | Stamm et al. ............... 711/144 |
| 5,539,893 | A | * | 7/1996 | Thompson et al. .......... 711/122 |
| 5,717,916 | A | | 2/1998 | Verma et al. |
| 6,449,695 | B1 | * | 9/2002 | Bereznyi et al. ............ 711/134 |
| 6,591,346 | B1 | | 7/2003 | Kottapurath |
| 2001/0013087 | A1 | | 8/2001 | Ronstrom |
| 2003/0005233 | A1 | | 1/2003 | Stewart et al. |

FOREIGN PATENT DOCUMENTS

| EP | 1160672 A2 | 12/2001 |
| JP | 1222352 A | 9/1989 |

OTHER PUBLICATIONS

Canadian Patent Office Action for application 2,570,556 dated Sep. 7, 2010.

* cited by examiner

*Primary Examiner* — Thu-Nguyet Le
(74) *Attorney, Agent, or Firm* — Yee & Associates, P.C.; Diana Roberts-Gerhardt (57) ABSTRACT

A method, computer program product, and a data processing system for maintaining objects in a lookup cache is provided. A primary list is populated with a first plurality of objects. The primary list is an unordered list of the first plurality of objects. A secondary list is populated with a second plurality of objects. The secondary list is an ordered list of the second plurality of objects. Periodically, at least one object of the first plurality of objects is demoted to the secondary list, and at least one object of the second plurality of objects is promoted to the primary list.

14 Claims, 7 Drawing Sheets

OPTIMIZED LEAST RECENTLY USED LOOKUP CACHE

BACKGROUND OF THE INVENTION

1. Technical Field

The present invention relates generally to an improved data processing system and in particular to a system and method for an optimized least recently used lookup cache. Still more particularly, the present invention provides a system and method for a least recently used lookup cache having reduced updates.

2. Description of Related Art

A set associative cache allows data from any address to be stored in a cache location. The cache address is used as a tag. All tags maintained by the cache must be compared with a requested address. If a tag matches the requested address, the matching tag's associated data is then accessed. A set associative cache requires an associative memory to hold the tags. A set associative cache separates objects to be cached into sets based on a unique identifier and every object will belong to one set only. As objects are added to the cache, each set can only grow to a limited size. Once the set has reached its full size, an existing object must be discarded each time a new object is added. Typically, the discarded object will be the least recently used (LRU) object in the set.

A name lookup cache is derived from the general set associative cache architecture. Because a name lookup cache generally contains only a subset of all existing objects in a system, as objects are added to the cache, each set can only grow to a limited size. Once the set has reached its full size, an existing object—typically the least recently used object—must be discarded every time a new object is added. Typically, the set is a linked list that is searched in a linear fashion starting at the head. The search ends when the object is found or the tail object is searched. If the object was found, it is moved from its current position in the list to the head of the list to implement an LRU algorithm. In the way, the most frequently accessed objects will tend to migrate toward the head of the list while the least recently used objects will be sifted toward the tail and ultimately be discarded from the list.

The present invention recognizes that the above-described name lookup cache and LRU implementation exhibits serious performance problems on modern large symmetric multiprocessor computers. Particularly, the LRU algorithm is implemented by moving objects to the head of the cache list and, thus, for every cache hit or insertion of a new object, the set's list anchor must be modified to point to the new list head object. Due to various characteristics of modern memory design, global data that is frequently modified presents a serious performance inhibition in a name lookup cache organized by an LRU algorithm.

Thus, it would be advantageous to provide an optimized look-up cache. It would be further advantageous to provide a look-up cache having an optimized LRU functionality. It would still be further advantageous to provide a look-up cache requiring less frequent updates to the list of cached objects compared to conventional lookup cache implementations.

SUMMARY OF THE INVENTION

The present invention provides a method, computer program product, and a data processing system for maintaining objects in a lookup cache. A primary list is populated with a first plurality of objects. The primary list is an unordered list of the first plurality of objects. A secondary list is populated with a second plurality of objects. The secondary list is an ordered list of the second plurality of objects. Periodically, at least one object of the first plurality of objects is demoted to the secondary list, and at least one object of the second plurality of objects is promoted to the primary list.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
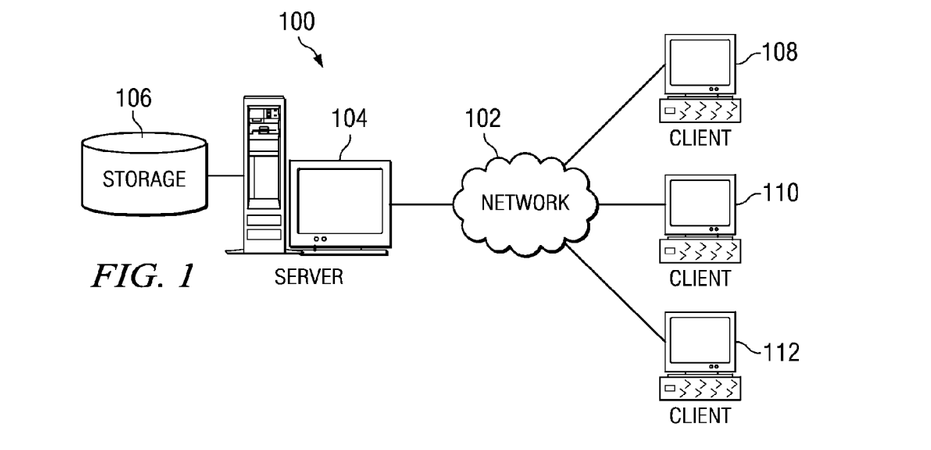
FIG. 1 is a pictorial representation of a data processing system in which a preferred embodiment of the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
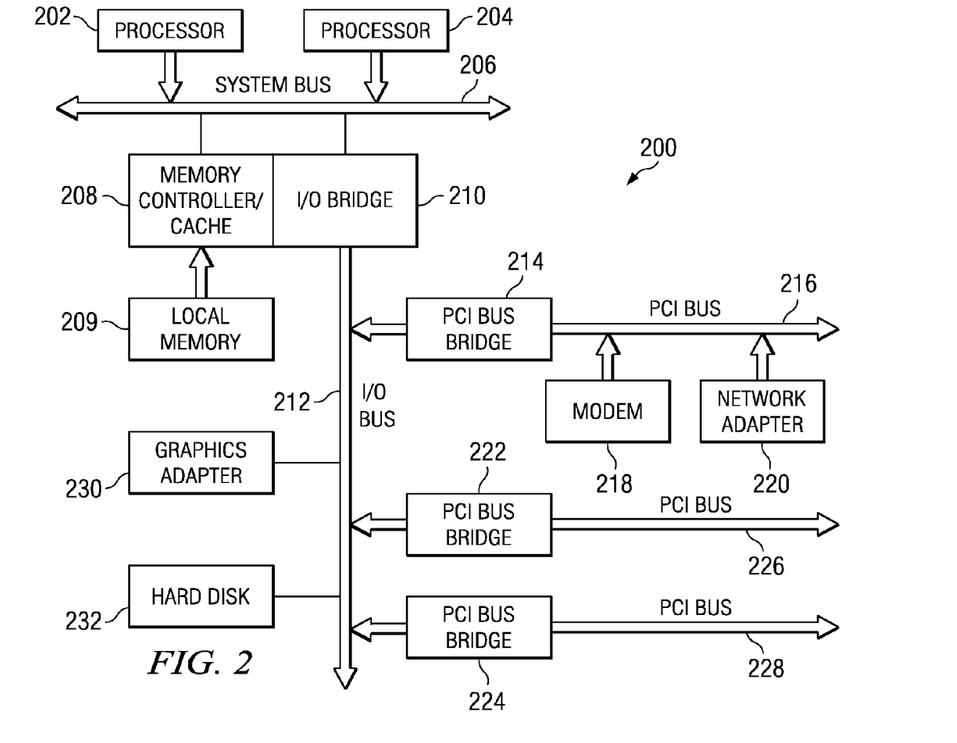
FIG. 2 is a block diagram of a data processing system in which a preferred embodiment of the present invention may be implemented.

Referring to FIG. 2, a block diagram of a data processing system, such as data processing system 100 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The present invention provides a cache system that may reduce the frequency of updates to the cache system. Two distinct cache lists referred to herein as a primary list and a secondary list of fixed sizes are initially empty. As objects are added to the cache, they are inserted at the head of the secondary list. At pre-defined intervals, the cache lists are updated by moving some objects from the secondary list to the primary list. Because the cache lists are of a fixed size, an equal number of objects are moved from the primary list to the secondary list during the cache update. Apart from the cache update, an anchor of the primary list is not changed and thus the primary list comprises unordered objects. The secondary list is maintained as an ordered list by an LRU algorithm.

Figure 3A:
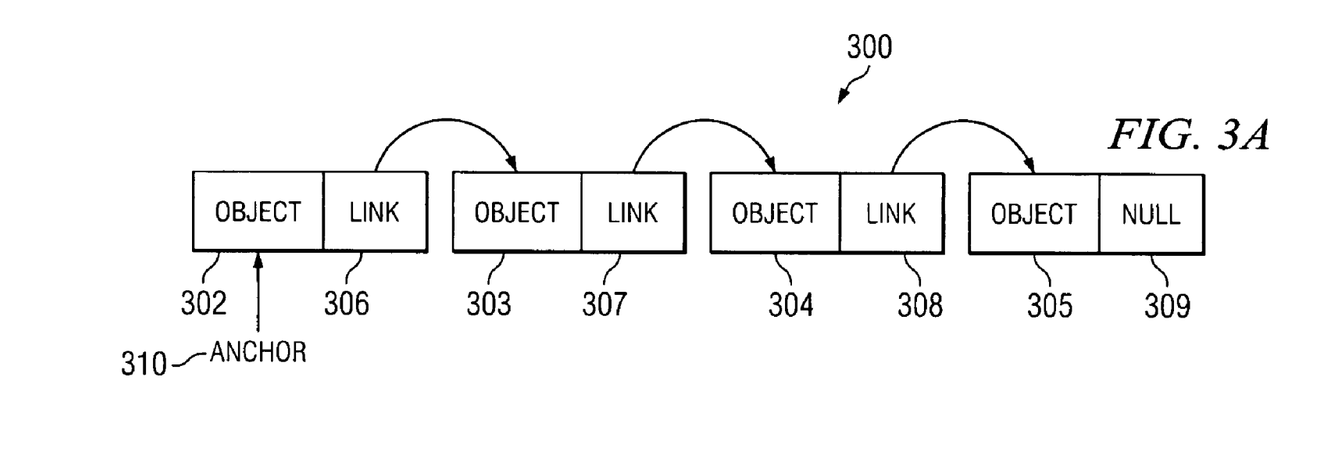
FIG. 3A is a diagrammatic illustration of a cache, such as a directory name lookup cache or file cache, comprising a linked list data structure as is conventional.

FIG. 3A is a diagrammatic illustration of a lookup cache, such as a directory name lookup cache or file cache, comprising a linked list data structure configured as is conventional. Linked list 300 comprises a plurality of objects 302-305 organized by a least recently used algorithm. Objects 302-305 each have an associated link 306-309. The lookup cache comprises an anchor 310, or handle, that references linked list 300. For example, anchor 310 may be a pointer that comprises an address of a head, or first, object of linked list 300. Links 306-308 comprise a pointer or address of the next object in linked list 300. Tail object 305 comprises the last object of linked list 300 and associated link 309 comprises a null pointer to designate object 305 as the last object of linked list 300. Thus, linked list 300 comprises a logically ordered list having object 302 at the head of the list with objects 303-305 sequentially ordered from the second to last object of linked list 300.

An LRU algorithm maintains objects 302-305 in an organization such that the most recently requested object is positioned at the head of linked list 300 and the least recently requested object is maintained as the tail of linked list 300. Intermediate objects between the head and tail of linked list 300 are positioned in linked list 300 according to the corresponding request order of the associated objects. Thus, in the illustrative example of FIG. 3A, object 302 is the most recently requested object and is positioned as the head of linked list 300. Object 305 is the least recently requested object and is positioned as the tail of linked list 300. Thus, objects 302-305 are positioned in linked list 300 from the most recently requested object to the least recently requested object.

Figure 3B:
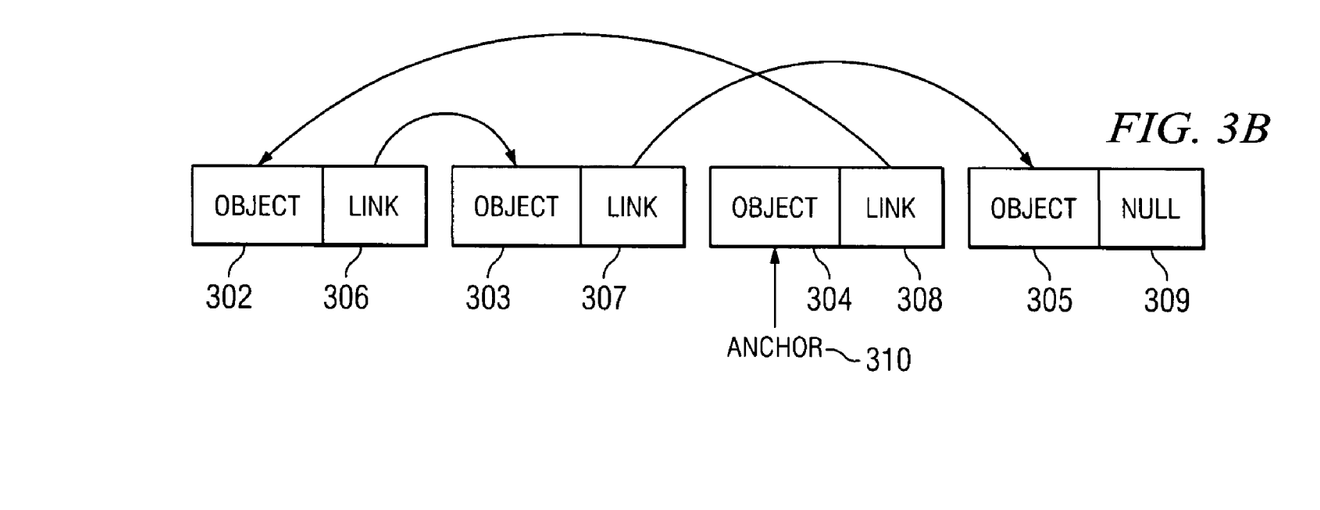
FIG. 3B is a diagrammatic illustration of linked list 300 organized by a LRU algorithm after a call or request for object 304 as is conventional.

FIG. 3B is a diagrammatic illustration of linked list 300 organized by a LRU algorithm after a call or request for object 304 as is conventional. The LRU algorithm modifies the organization of linked list 300 according to the order in which objects of the linked list have been requested. In the illustrative example, object 304 is requested and the LRU modifies the linked list to properly indicate that object 304 is currently the most recently used object. For example, the LRU algorithm may modify anchor 310 to reference object 304 by writing the address of object 304 to the anchor and thus configuring the linked list with object 304 positioned as the head object. Additionally, link 308 associated with object 304 is revised to properly reference the previous head object. In the illustrative example, link 308 is revised by the LRU algorithm to point to object 302 that was positioned as the head of linked list 300 prior to the request or object 304. Additionally, link 307 associated with object 303 is revised to point to tail object 305.

When a requested object is not located in the lookup cache, a global search may be performed, e.g., by a file management system. In the event the requested object is located globally, it is returned to the requesting entity and inserted as the head object of linked list 300. Accordingly, tail object 305 is discarded in the event that no additional capacity remains for objects within linked list 300. A similar update of linked list 300 is required as that described above with reference to FIG. 3B.

The present invention provides a cache system that may reduce the frequency of updates to the cache system. In a preferred embodiment of the present invention, an anchor may comprise two pointers, or an implementation as two anchors, that respectively point to two distinct cache lists referred to herein as a primary list and a secondary list. Each list is of a fixed size and is initially empty. As objects are added to the cache, these objects are inserted at the head of the secondary list. At pre-defined intervals, the cache lists are updated by moving some objects from the secondary list to the primary list. Because the cache lists are of a fixed size, an equal number of objects are moved from the primary list to the secondary list during the cache update. Apart from the cache update, the anchor of the primary list is not changed and thus the primary list comprises unordered objects. The secondary list is maintained as an ordered list by an LRU algorithm.

Preferably, the object(s) moved from the secondary list to the primary list in a cache update is selected based on its order within the secondary list. Particularly, one or more of the most recently used objects selected for promotion from the secondary list to the primary list are selected from the head of the secondary list, or a contiguous object set including the head of the secondary list. Any one of various parameters or decision criteria may be used for selecting the object, or set of objects, to be demoted from the primary list to the secondary list during a cache update. For example, a hit counter may be used to accumulate a request count for the objects within the primary list and/or the secondary list. At the pre-defined cache update interval, one or more objects having a hit count less than a threshold may be selected for demotion to the secondary list.

Alternatively, a predetermined number of objects having the smallest hit count may be selected for demotion to the secondary list. In yet another embodiment, the cache system may evaluate all hit counts of objects in the primary list and compare them with hit counts of objects in the secondary list. Any object having a hit count in the primary list that is less than a hit count of an object in the secondary list may be selected for demotion to the secondary list while the object in the secondary list having the hit count exceeding the hit count of the primary list object is promoted to the primary list. Other implementations for selecting objects of the primary list for demotion to the secondary list may be suitably substituted.

Figure 4A:
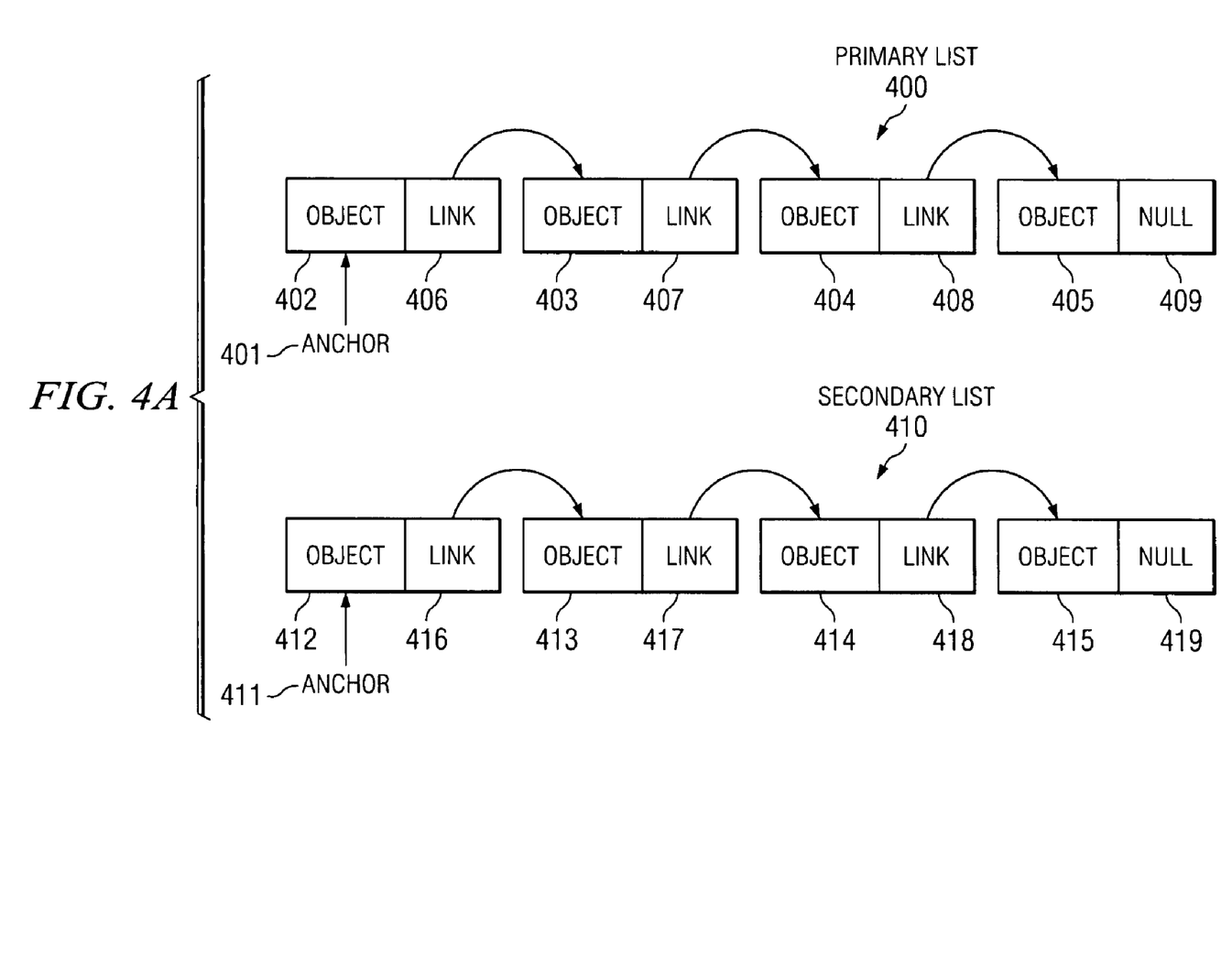
FIG. 4A is a cache system comprising a primary list and a secondary list implemented according to a preferred embodiment of the present invention.

FIG. 4A is a cache system implemented according to a preferred embodiment of the present invention. The cache system comprises a primary list 400 and a secondary list 410. Primary list 400 comprises one or more objects 402-405 each having a respective link 406-409. Anchor 401 references primary list 400. For example, anchor 401 may be implemented as a pointer comprising an address to one of objects 402-405. In the illustrative example, anchor 401 comprises a pointer to object 402. Links 406-408 reference respective objects within list 400. Link 409 associated with object 405 comprises a null to indicate that the associated object 405 is the tail object of primary list 400. Objects of primary list 400 are not maintained in a logical ordering. That is, an LRU algorithm or other ordering algorithm does not maintain an order of objects 402-405 within list 400.

Additionally, the cache system comprises secondary list 410 comprising objects 412-415 and associated links 416-419. Secondary list 410 is an ordered object list comprising head object 412, tail object 415, and intermediate objects 413 and 414 positioned therebetween. Anchor 411 comprises a pointer to secondary list 410 by pointing to an object positioned as a head of secondary list 410. In the illustrative example of FIG. 4A, secondary list 410 is configured with object 412 positioned as the head object and object 415 positioned as the tail object.

In accordance with a preferred embodiment of the present invention, an LRU or other suitable algorithm maintains objects 412-415 sequentially ordered according to their associated usage such that the position of objects 412-415 within secondary list 410 corresponds to the order in which the objects have been requested or otherwise used. Particularly, the head object of secondary list 410 is maintained as the most recently used object with each remaining object positioned in descending order according to their associated usage.

As mentioned above, objects in primary list 400 are not maintained within list 400 according to any usage order. For example, assume a request is made for object 403. A cache system of the present invention first searches primary list 400 to determine if the requested object is maintained in primary list 400. In the event that the requested object is stored in primary list 400, the requested object is returned to the requesting entity, e.g., an application or file system. No update to the primary list is performed due to retrieval of a requested object from primary list 400.

Assume for illustrative purposes that a request is issued for object 414. The cache system first searches primary list 400 and determines that the requested object is not stored in primary list 400. The cache system then proceeds to search secondary list 410. In the illustrative example, object 414 is returned to the requesting entity. Additionally, the secondary list is updated to properly comprise a descending order of objects according to their usage. Thus, the cache system modifies the anchor 411 that points to the head object of secondary list 410 to point to the most recently requested object 414 as shown by the diagrammatic illustration of the cache system implemented according to a preferred embodiment of the present invention in FIG. 4B. Additionally, link 418 associated with object 414 is modified to point to previous head object 412 that is now demoted to the second-most upper, or recently used, object in secondary list 410. Likewise, link 417 is revised to point to tail object 415. Thus, secondary list 410 is updated to maintain a sequential ordering of objects in descending order of their associated usage. In the illustrative example of FIG. 4B, object 414 is logically positioned as the head object indicating object 414 is the most recently used object within secondary list 410. Objects 412, 413, and 415 are configured in descending order according to their usage.

Figure 4B:
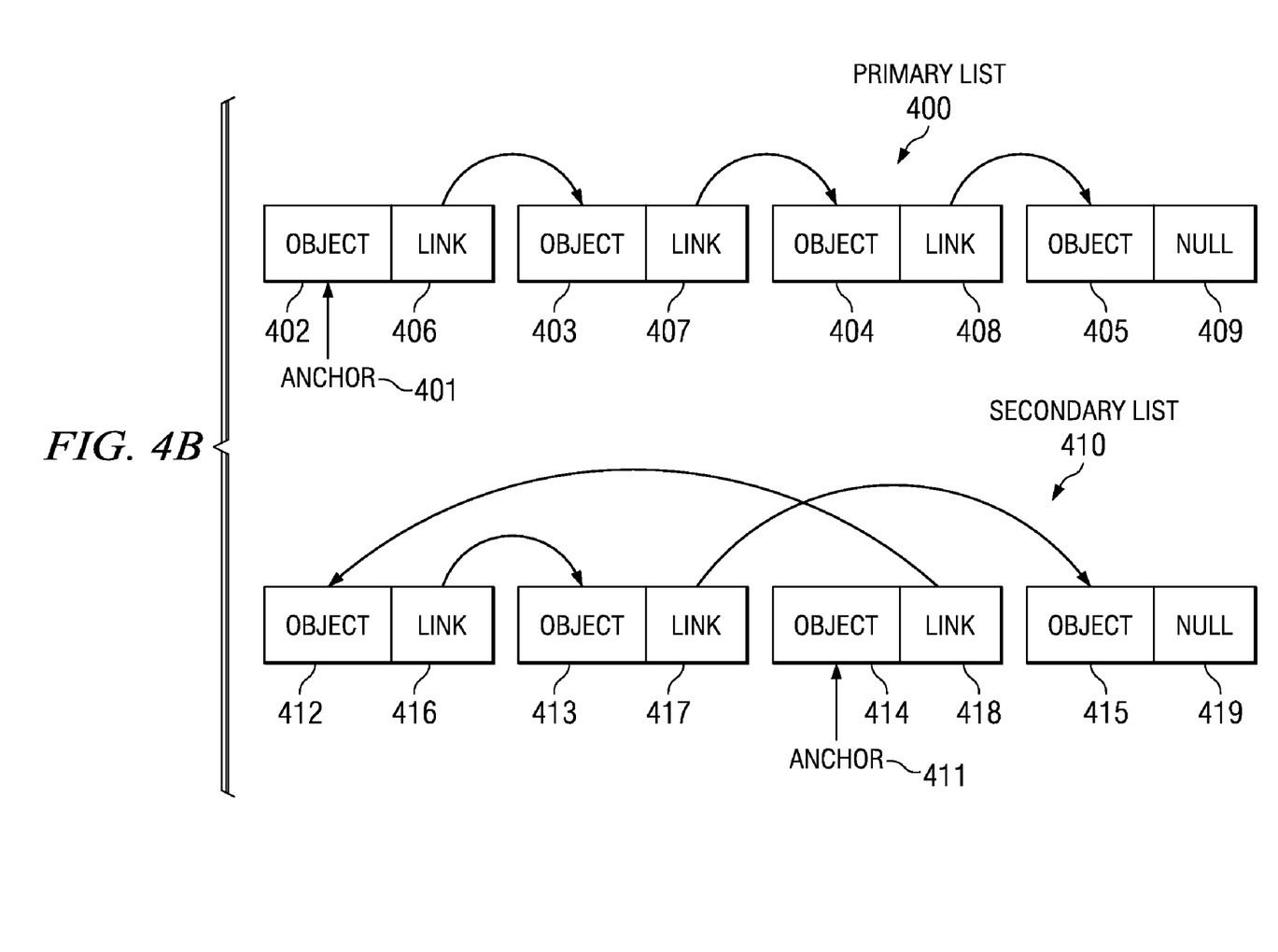
FIG. 4B is a diagrammatic illustration of the cache system of FIG. 4A showing a reorganization of the cache system after a cache hit of the secondary list.

Assume now that an object is requested that is not located in either primary list 400 or secondary list 410. The cache system, after searching the primary list and the secondary list, may attempt a global location of the requested object. For example, the cache system may interface with a file management system or other suitable application that attempts to retrieve the requested object. In the event that the requested object is obtained globally, the requested object is returned to the requesting entity. Additionally, the cache system is updated by adding the globally-retrieved object to secondary list 410. Particularly, the globally-retrieved object is added to secondary list 410 as the head object and the previous tail object of secondary list 410 is discarded from secondary list 410.

Figure 4C:
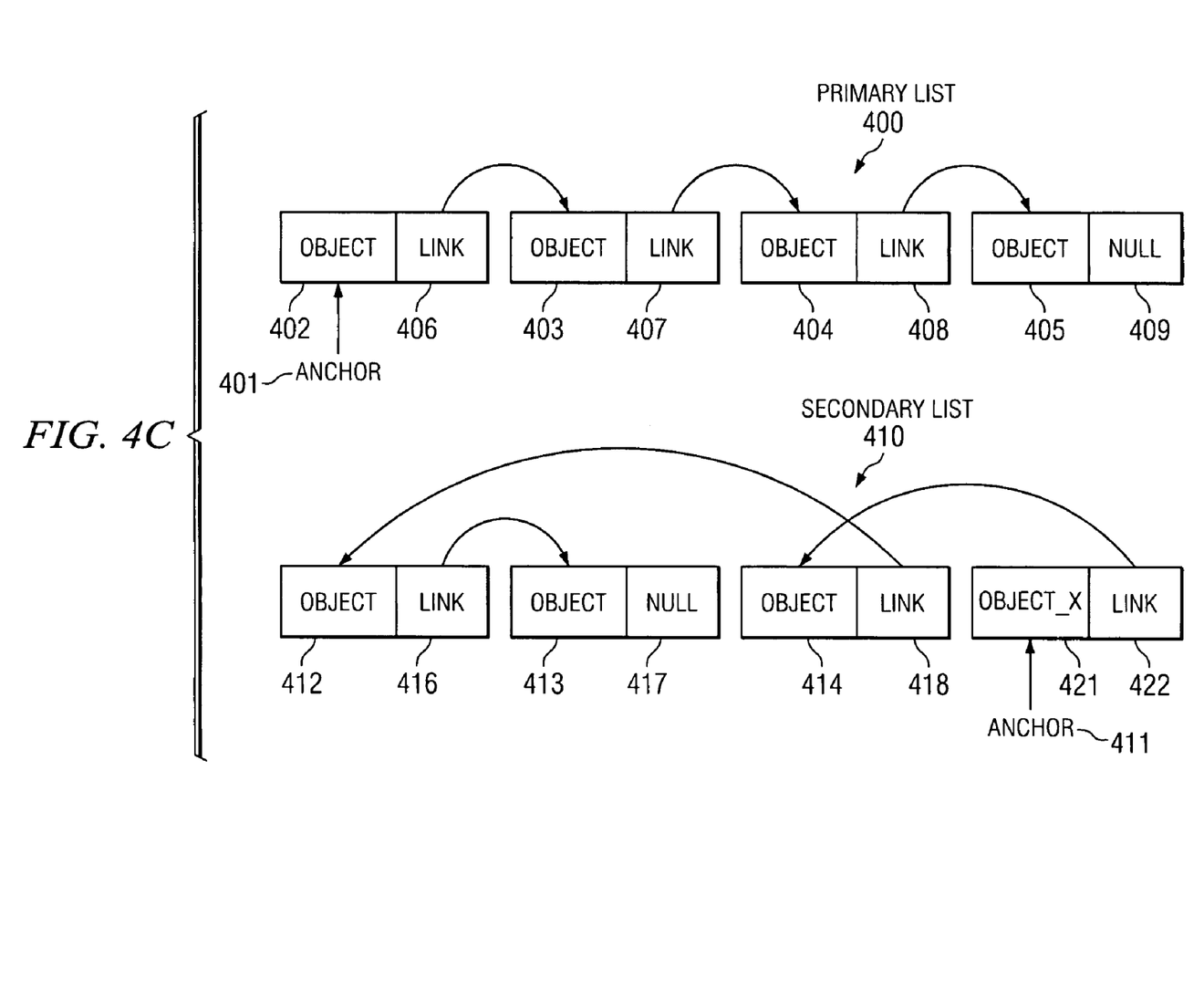
FIG. 4C is a diagrammatic illustration of the cache system shown in FIGS. 4A and 4B after a global-retrieval of a requested object.

FIG. 4C is a diagrammatic illustration of the cache system shown in FIGS. 4A and 4B after a global-retrieval of a requested object in accordance with a preferred embodiment of the present invention. In the illustrative example, assume a requested object (illustratively designated object_X) is not located in primary list 400 and secondary list 410, and a subsequent global search results in location of the requested object. The globally-retrieved object is returned to the requesting entity and is inserted into secondary list 410 as the head object. In the illustrative example, object 421 is the globally-retrieved object and is inserted into the secondary list 410. Anchor 411 is modified to point to globally-retrieved object 421. Additionally, link 422 associated with object 421 is configured to point to the previous head object 414 and link 417 is revised as a null pointer to indicate associated object 413 is the tail object. The previous tail object (object 415 in FIG. 4B) has been discarded to provide sufficient capacity for the newly inserted object 421 within secondary list 410.

Figure 4D:
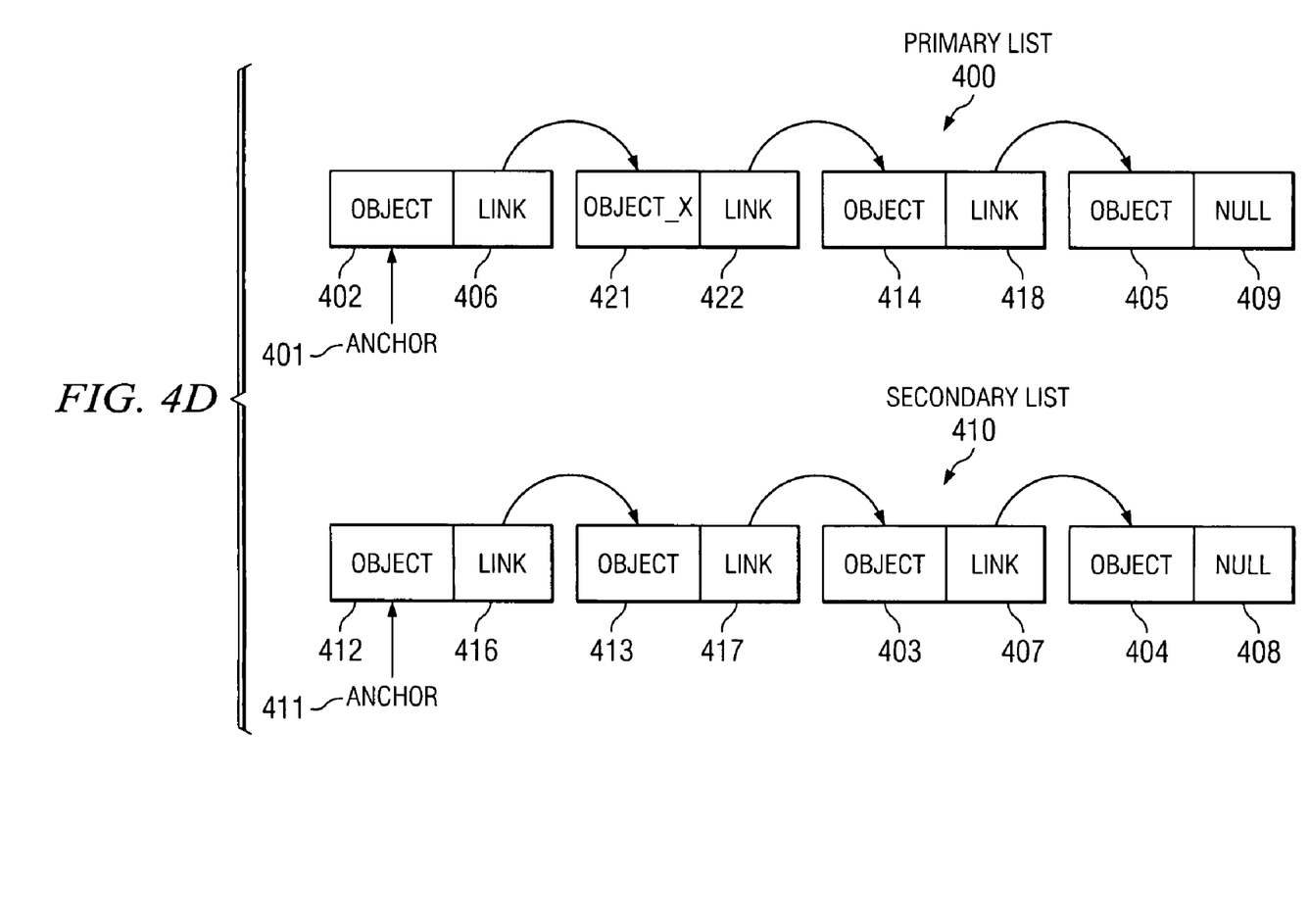
FIG. 4D is a diagrammatic illustration of the cache system of FIGS. 4A-4C after a periodic cache update implemented according to a preferred embodiment of the present invention.

FIG. 4D is a diagrammatic illustration of the cache system of FIGS. 4A-4C after a periodic cache update implemented according to a preferred embodiment of the present invention. Updates to the cache system are preferably performed at pre-defined intervals. The cache update is designed to exchange objects between the ordered secondary list with the non-ordered primary list. Preferably, objects of the primary list that are exchanged with objects of the secondary list are used less frequently than the objects promoted from the secondary list. Accordingly, a hit count, or other suitable mechanism, of objects within the primary list and/or secondary list may be used for evaluating whether to exchange objects between the primary and secondary lists. FIG. 4D is illustrative of a cache update evaluation that resulted in identification of objects 403 and 404 for demotion to secondary list 410 and identification of objects 414 and 421 for promotion from secondary list 410 to primary list 400. In the illustrative example, objects 403 and 404 moved from primary list 400 to secondary list 410 are positioned at the lower-end of secondary list 410. Other implementations may position objects demoted from primary list 400 at the upper end of secondary list 410, or alternatively, objects demoted from primary list 400 may be positioned within secondary list 410 based on usage metrics or other parameters compared with secondary list 410 objects.

Figure 5:
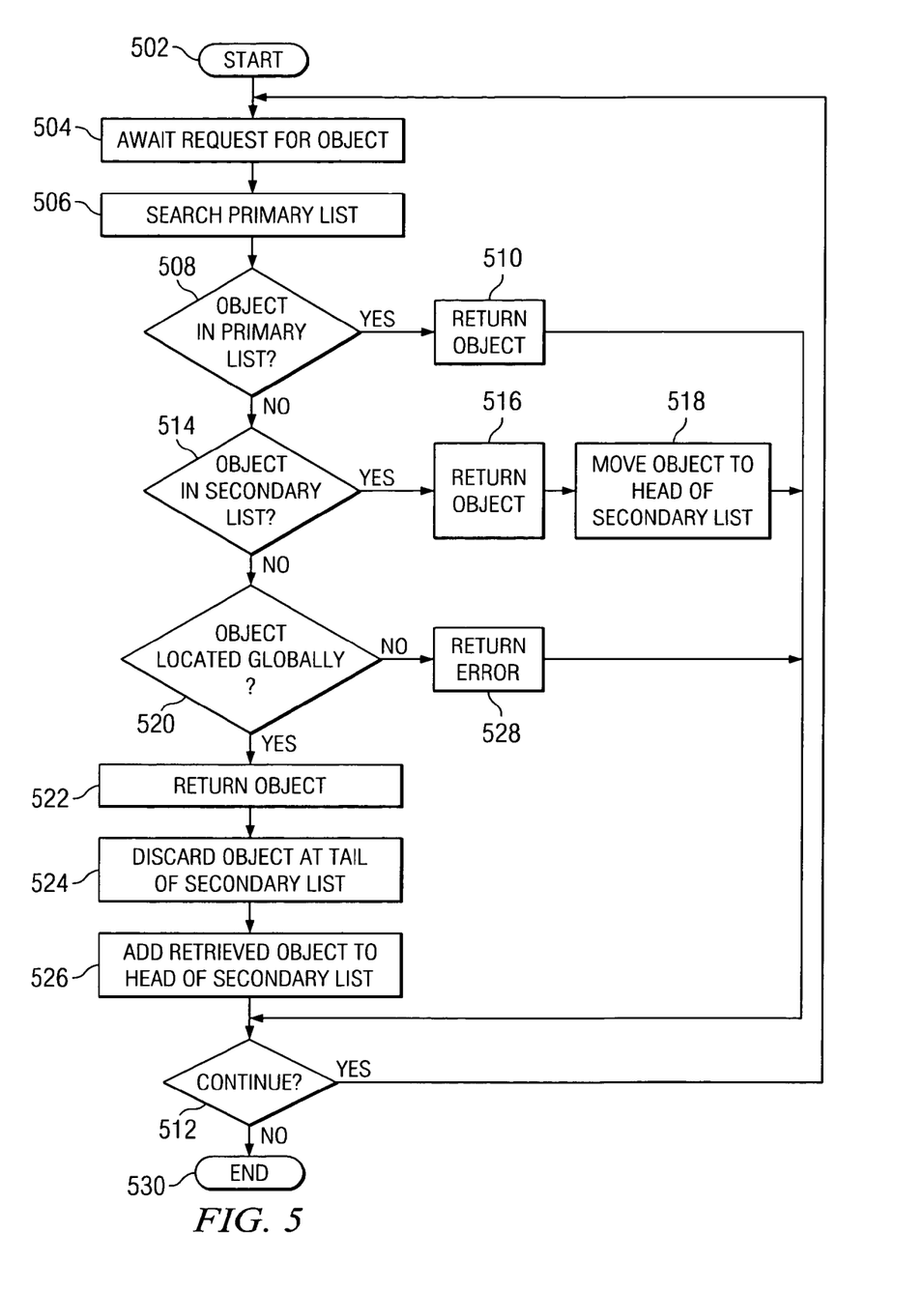
FIG. 5 is a flowchart of processing performed by the cache system for returning requested objects implemented according to a preferred embodiment of the present invention.

FIG. 5 is a flowchart of processing performed by the lookup cache for locating requested objects implemented according to a preferred embodiment of the present invention. The lookup cache processing routine is preferably implemented as a computer-readable instruction set that is fetched, for example from local memory 209, and executed by a processing unit such as processor 202 or 204. The routine is initialized (step 502) and awaits receipt of a request for an object (step 504). Responsive to receipt of a request for an object, a search for the requested object is then performed on the primary list (step 506). An evaluation is made to determine if the requested object is located in the primary list (step 508). In the event the requested object is located in the primary list, the routine returns the object to the requesting entity (step 510) and an evaluation is subsequently made to determine if the routine is to continue (step 512). In the event that the routine is to continue, processing returns to step 504 to await receipt of the next object request. If it is determined that the routine is to exit, the cache lookup routine proceeds to exit (step 530).

Returning again to step 508, in the event that the requested object is not located in the primary list, the routine proceeds to search the secondary list and evaluate whether the requested object is located in the secondary list (step 514). The cache lookup routine returns the requested object (step 516) and moves the object to the head of the secondary list (step 518) if the requested object is located in the secondary list, and the routine proceeds to step 512 to evaluate whether the cache lookup routine is to continue.

If a determination is made at step 514 that the object is not located in the secondary list, a global search is performed and an evaluation is made to determine if the requested object is located globally (step 520). If the object is located globally, the requested object is returned to the requesting entity (step 522). The tail object of the secondary list is then discarded (step 524) and the globally retrieved object is added to the secondary list as the new head object (step 526). The cache lookup routine then returns to step 512 to evaluate whether additional processing is to be performed. In the event that the object is not globally located at step 520, an error message 528 may then be returned to the requesting entity and the routine the proceeds to step 512 to evaluate whether additional processing is to be performed.

Thus, an optimized look-up cache is provided. The look-up cache of the present invention has an optimized LRU functionality that reduces the frequency of cache updates. Particularly, the lookup cache of the present invention includes a primary list of unordered objects and a secondary list of ordered objects. Periodic updates are performed for promoting objects from the secondary list to the primary list and for demoting objects from the primary list to the secondary list. By periodically migrating the most frequently used objects of the secondary list to the primary list, the primary list will tend to maintain the most frequently used objects. Retrieval of objects from the primary list results in no modification or revisions due to the primary list being unordered. Accordingly, the lookup cache may be subjected to less frequent updates that conventional lookup cache systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of maintaining objects in lists in a lookup cache, comprising:
    populating, by a processor, a primary list in the lookup cache and a secondary list in the lookup cache with objects;
    accumulating, by the processor, a count of the number of times each object in each list in the lookup cache is requested;
    identifying, by the processor, objects in the secondary list that are used more often than objects in the primary list and objects in the primary list that are used less often than objects in the secondary list, wherein the identification is based on the count of the number of times each object in the lookup cache is requested;
    determining, by the processor, a total number of objects to swap between the primary list and the secondary list based on swapping as many of the identified objects as possible without changing a total number of objects in either the primary list or the secondary list; and
    swapping, by the processor, the total number of objects between the primary list and the secondary list without changing the total number of objects in either the primary list or the secondary list, wherein the primary list is an unordered list and the secondary list has an order maintained by the processor that is based on the count.

2. The method of claim 1, further comprising:
    responsive to receiving a request for a particular object, searching the primary list for the particular object.

3. The method of claim 2, further comprising:
    responsive to determining the particular object is not included in the primary list, searching the secondary list for the particular object.

4. The method of claim 3, further comprising:
    responsive to determining the particular object is located in the secondary list, modifying the secondary list such that the particular object is located as a head object of the secondary list.

5. The method of claim 1, further comprising:
responsive to receiving a request for a particular object, determining whether the particular object is included in the the primary list;
in response to determining that the particular object is included in the primary list, returning the particular object; and
wherein the primary list remains an unordered list after the particular object has been returned.

6. The method of claim 1, further comprising:
responsive to receiving a request for a particular object, determining whether the particular object is included in the primary list;
in response to determining that the particular object is not included in the primary list, determining whether the particular object is included in the secondary list;
in response to determining that the particular object is not included in the secondary list, obtaining the particular object from a storage device; and
adding the particular object to the secondary list as a head object of the secondary list.

7. A computer program product stored in a computer recordable-type medium for maintaining objects in lists in a lookup cache, the computer program product comprising:
computer usable instructions for populating a primary list in the lookup cache;
computer usable instructions for populating a secondary list in the lookup cache with objects;
computer usable instructions for accumulating a count of the number of times each object in each list in the lookup cache is requested;
computer usable instructions for identifying objects in the secondary list that are used more often than objects in the primary list and objects in the primary list that are used less often than objects in the secondary list, wherein the identification is based on the count of the number of times each object in the lookup cache is requested;
computer usable instructions for determining a total number of objects to swap between the primary list and the secondary list based on swapping as many of the identified objects as possible without changing a total number of objects in either the primary list or the secondary list; and
computer usable instructions for swapping the total number of objects between the primary list and the secondary list without changing the total number of objects in either the primary list or the secondary list, wherein the primary list is an unordered list and the secondary list has an order maintained by the processor that is based on the count.

8. The computer program product of claim 7, further comprising:
computer usable instructions that receive a request for a particular object; and
computer usable instructions that search the primary list for the particular object and, responsive to determining that the particular object is not located in the primary list, search the secondary list for the particular object.

9. The computer program product of claim 8, further comprising computer usable instructions that modify the secondary list such that the particular object is positioned as a head object of the secondary list responsive to determining the particular object is located in the secondary list.

10. The computer program product of claim 7, further comprising:
computer usable instructions for determining whether a particular object is included in the primary list responsive to receiving a request for the particular object;
in response to determining that the particular object is included in the primary list, computer usable instructions for returning the particular object; and
wherein the primary list remains an unordered list after the particular object has been returned.

11. The computer program product of claim 7, further comprising:
computer usable instructions for determining whether a particular object is included in the primary list responsive to receiving a request for the particular object;
in response to determining that the particular object is not included in the primary list, computer usable instructions for determining whether the particular object is included in the secondary list;
in response to determining that the particular object is not included in the secondary list, computer usable instructions for obtaining the particular object from a storage device; and
computer usable instructions for adding the particular object to the secondary list as a head object of the secondary list.

12. A data processing system for maintaining objects in lists in a lookup cache, comprising:
a memory that contains a set of instructions and the lookup cache; and
a processing unit, responsive to execution of the set of instructions, that populates a primary list in the lookup cache and a secondary list in the lookup cache with objects; accumulates a count of the number of times each object in each list in the lookup cache is requested; identifies objects in the secondary list that are used more often than objects in the primary list and objects in the primary list that are used less often than objects in the secondary list, wherein the identification is based on the count of the number of times each object in the lookup cache is requested; determines a total number of objects to swap between the primary list and the secondary list based on swapping as many of the identified objects as possible without changing a total number of objects in either the primary list or the secondary list; and swaps the total number of objects between the primary list and the secondary list without changing the total number of objects in either the primary list or the secondary list, wherein the primary list is an unordered list and the secondary list has an order maintained by the processor that is based on the count.

13. The data processing system of claim 12, wherein the processing unit determines whether a particular object is included in the primary list responsive to receiving a request for the particular object; in response to determining that the particular object is included in the primary list, returns the particular object; and wherein the primary list remains and unordered list after the particular object has been returned.

14. The data processing system of claim 12, wherein the processing unit determines whether a particular object is included in the primary list responsive to receiving a request for the particular object; in response to determining that the particular object is not included in the primary list, determines whether the particular object is included in the secondary list; in response to determining that the particular object is not included in the secondary list, obtains the particular object from a storage device; and adds the particular object to the secondary list as a head object of the secondary list.

* * * * *